(No Model.) 2 Sheets—Sheet 1.
A. CHAMBERS.
WATER TRAP FOR GAS MAINS.
No. 380,860. Patented Apr. 10, 1888.
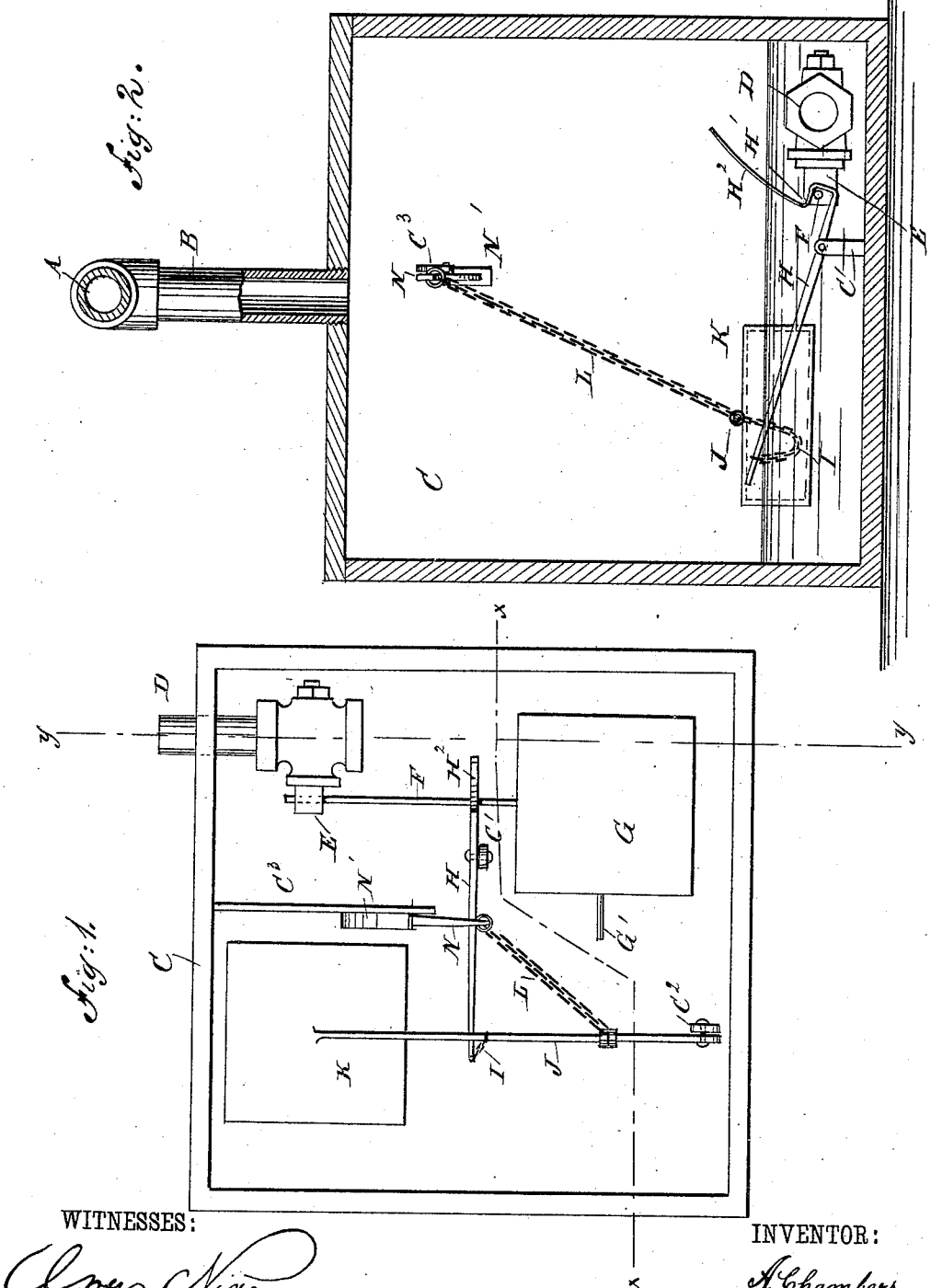
WITNESSES:
INVENTOR:
A. Chambers.
BY Munn & Co
ATTORNEYS.

(No Model.) 2 Sheets—Sheet 2.
A. CHAMBERS.
WATER TRAP FOR GAS MAINS.
No. 380,860. Patented Apr. 10, 1888.
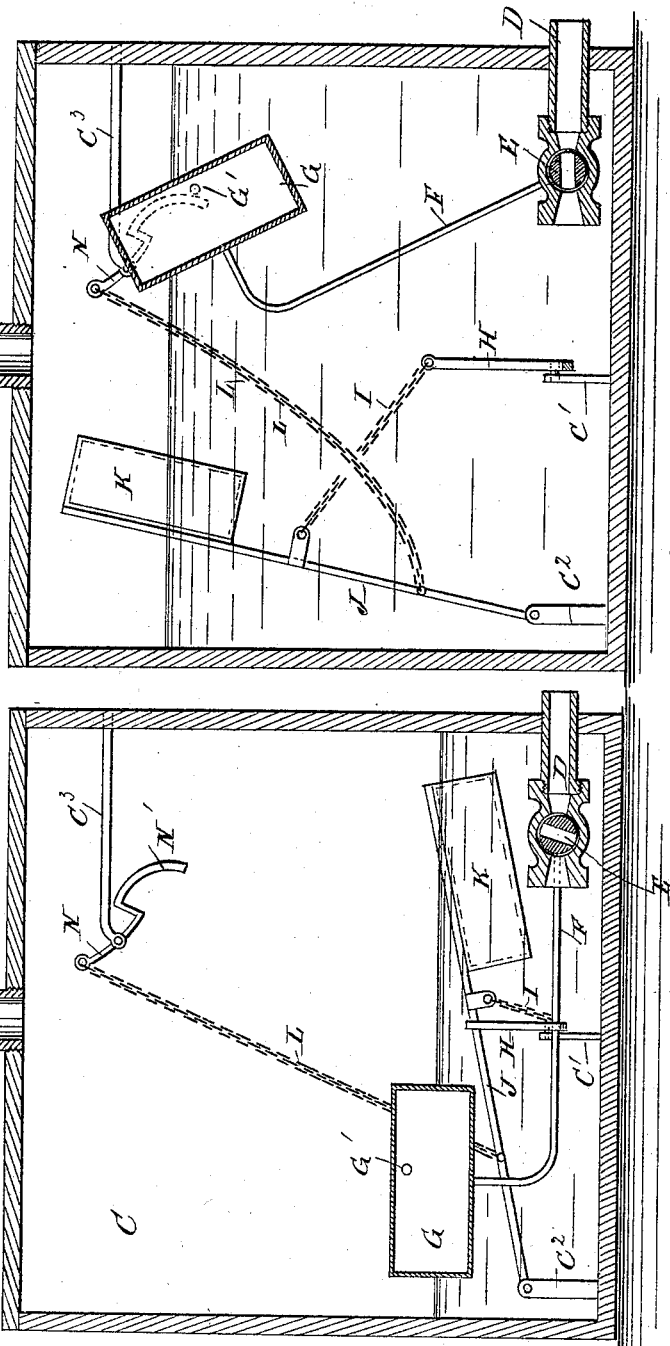
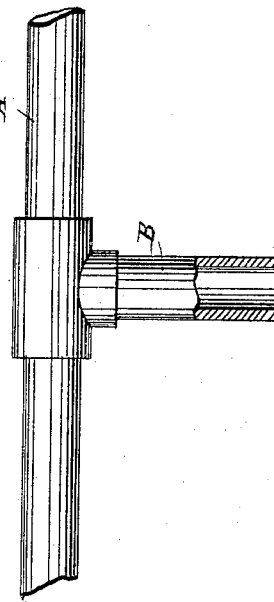
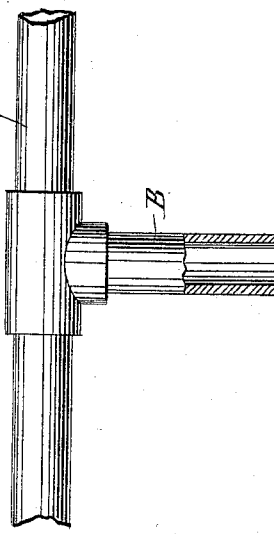
WITNESSES:
INVENTOR:
A. Chambers.
BY Munn & Co.
ATTORNEYS.

UNITED STATES PATENT OFFICE.

ALEXANDER CHAMBERS, OF TOLEDO, OHIO.

WATER-TRAP FOR GAS-MAINS.

SPECIFICATION forming part of Letters Patent No. 380,860, dated April 10, 1888.

Application filed June 30, 1887. Serial No. 242,691. (No model.)

*To all whom it may concern:*

Be it known that I, ALEXANDER CHAMBERS, of Toledo, in the county of Lucas and State of Ohio, have invented a new and Improved Water-Trap for Gas-Mains, of which the following is a full, clear, and exact description.

The object of my invention is to provide a new and improved water-trap especially adapted for automatically discharging the water accumulating in natural-gas pipes without loss of gas.

The invention consists of an arm secured by one end to the outlet-valve and carrying a float on its other end, of a lever fulcrumed in the float-chamber and carrying a float, and of means for locking the said valve-arm, so that its valve remains closed until the water nearly fills the casing and raises the lever and its float, which then unlocks the valve-arm, thus opening the valve for the discharge of the water.

The invention also consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1 is a plan view of my improvement. Fig. 2 is a vertical cross-section of the same on the line $x\,x$ of Fig. 1. Fig. 3 is a sectional side elevation of the same on the line $y\,y$ of Fig. 1, showing the water-outlet valve closed; and Fig. 4 is a similar view of the same, showing the water-outlet valve open.

The main-line pipe A, through which the gas passes, is provided at suitable intervals with a branch pipe, B, opening into the trap-casing C, of suitable size and construction, and provided near its bottom with an outlet-pipe, D, carrying on its inner end a valve, E, which, when open, permits the water accumulating in the trap-casing C to flow out of the same to the outside. When said valve E is closed, the water is prevented from passing out of the casing C, and at the same time the gas passing into the trap-casing C cannot escape through said valve and its outlet-pipe D, as the latter is covered by a certain quantity of water held continuously in said casing C, thus sealing said valve and the outlet-pipe D.

On the outer end of the valve E is secured one end of the arm F, extending longitudinally in the casing C and carrying on its other bent end a float, G, of suitable size and shape and provided on its outside with a pin, G'. In the casing C is erected a post, C', on which is fulcrumed a transverse lever, H, provided on one end with a catch, H', adapted to engage said arm F, and provided with an upwardly-extending arm, H², for guiding said arm F into the catch H', as hereinafter more fully explained. The other end of said lever H is connected by a chain or rope, I, with a lever, J, fulcrumed at one end on a post, C², erected in the bottom of the casing C, and on the other end of said lever J is formed a float, K, similar in size and construction to the float G, above referred to. Between the float K and the fulcrum of the lever J is secured to the latter one end of a chain or rope, L, extending upward, and being connected at the other end with a tripping-lever, N, having a bent arm, N', and being fulcrumed on a bracket, C³, secured to one side of the casing C.

The operation is as follows: When the valve E is closed, as shown in Figs. 1, 2, and 3, then the water in the casing C holds the floats G and K in such a position that the chain I, connected with the float-lever J, remains in a slack position, so that the lever H, connected with said chain I, engages by means of its catch H' the arm F, which is held in a nearly horizontal position by its float G, supported by the water remaining in the casing C. As the water now accumulates in the casing from the main-line pipe A and through the branch pipe B, the float K rises with the water, while the float G is held in a locked position under the water by the catch H' of the lever H. When the water has risen to a certain height so as to fill the casing C sufficiently, as shown in Fig. 4, the chain I becomes taut and pulls on the lever H, so that the catch H' disengages the arm F, whereby the float G rises to the surface of the water, thereby turning the valve E into an open position, as shown in Fig. 4, so that the water escapes from the casing C through the outlet-pipe D. As before described, the pin G' of the float G (in the upward motion of said float) passes the bent arm N' of the tripping-lever N, so that said pin G' rests against the rear edge of said lever N, which is sufficiently weighted to hold said float and its arm F in position until the water has assumed its former level, as shown in Fig. 3. When the water falls in the box or casing C on account of being discharged, as above described, through the pipe D, it carries with it the float K, and when the water nearly reaches the level shown in Fig. 3 the lever J exerts a pull on the chain L, thus imparting a swinging motion to the tripping-lever N, whereby the curved arm N' swings upward and disengages the pin G', so that the float G swings downward into its normal position, thereby closing the valve E suddenly, and thus preventing the water from escaping from the box C after the normal level has been reached. The float G in its downward swinging motion causes its lever F to strike against the curved arm H² of the lever H, which thus swings on its fulcrum slightly until the arm F again engages the catch H', so that said arm F and its valve E are again held in a locked position, as before described. The water now again accumulates in the box C, and the above-described operation is repeated.

Having thus fully described my invention, I claim as new and desire to secure by Letters Patent—

1. In a water-trap, the combination, with an arm secured by one end to the outlet-valve and a float secured to the other end of the said arm, of a catch-lever fulcrumed in the trap-casing and adapted to lock the said arm in place, and a lever carrying a float and fulcrumed in the trap-casing and adapted to unlock the said catch-lever from the said arm when sufficient water has accumulated in the casing, substantially as shown and described.

2. In a water-trap, the combination, with an arm secured by one end to the outlet-valve and carrying a float on its other end, of a lever having a catch adapted to lock the said arm in place, a second lever fulcrumed in the trap-casing and carrying a float, and a chain connecting the said second lever with the lever having the catch, substantially as shown and described.

3. In a water-trap, the combination, with an arm secured by one end to the outlet-valve and a float held on the other end of said arm, said float being provided with a pin, of a tripping-lever adapted to engage said pin on said float, a chain connected with said tripping-lever, a lever pivoted in the trap-casing and connected with said chain, and a float held on said lever, substantially as shown and described.

4. In a water-trap, the combination, with a casing connected with the main line, of an outlet-pipe held in said casing, a valve secured to the inner end of said outlet-pipe, which, with its valve, is sealed by water in the casing, an arm secured to one end of said valve, a float provided with a pin and secured to the other end of said arm, and a tripping-lever adapted to engage said pin on said float, so as to hold the valve in an open position until a sufficient quantity of the water accumulated in the casing has been discharged, substantially as shown and described.

ALEXANDER CHAMBERS.

Witnesses:
F. D. McCutcheon,
Rufus H. Baker.